(12) United States Patent
Grimes et al.

(10) Patent No.: US 9,816,889 B2
(45) Date of Patent: Nov. 14, 2017

(54) DIFFERENTIAL PRESSURE SENSING DEVICE WITH OVERLOAD PROTECTION

(71) Applicants: Omega Engineering, Inc., Fairfield, CT (US); Cyrus Grimes, Columbus, OH (US)

(72) Inventors: Cyrus Grimes, Columbus, OH (US); Graham Tomblin, Columbus, OH (US)

(73) Assignee: Omega Engineering, Inc., Stamford, CT (US)

(*) Notice: Subject to any disclaimer, the term of this patent is extended or adjusted under 35 U.S.C. 154(b) by 68 days.

(21) Appl. No.: 14/855,551

(22) Filed: Sep. 16, 2015

(65) Prior Publication Data

US 2016/0223420 A1 Aug. 4, 2016

Related U.S. Application Data

(60) Provisional application No. 62/110,097, filed on Jan. 30, 2015.

(51) Int. Cl.
*G01L 19/04* (2006.01)
*G01L 19/06* (2006.01)
*G01L 13/02* (2006.01)

(52) U.S. Cl.
CPC ........ *G01L 13/025* (2013.01); *G01L 19/0618* (2013.01)

(58) Field of Classification Search
CPC ....... G01L 13/02; G01L 13/025; G01L 19/04; G01L 19/06; G01L 19/0618; G01L 19/00
See application file for complete search history.

(56) References Cited

U.S. PATENT DOCUMENTS

| 3,178,937 | A | * | 4/1965 | Bradley | G01L 1/02 |
| | | | | | 177/210 R |
| 3,807,232 | A | * | 4/1974 | Wetterhorn | G01L 7/04 |
| | | | | | 73/708 |
| 3,999,435 | A | * | 12/1976 | Siegel | G01F 23/164 |
| | | | | | 73/708 |

(Continued)

FOREIGN PATENT DOCUMENTS

| DE | 2523869 A1 | * | 12/1976 | ......... G01L 19/0046 |
| JP | 59050328 A | * | 3/1984 | ........... G01L 13/025 |

*Primary Examiner* — Nguyen Ha
(74) *Attorney, Agent, or Firm* — Dennemeyer & Associates, LLC

(57) ABSTRACT

A sensing system that provides an isolation diaphragm through which pressure is transmitted from a process fluid to a fill fluid contained within the sensing system's body is provided. In the system, fill fluid transfers pressure to semiconductor sensors that provide signals for both the differential pressure and the static pressure, thereby allowing for signal conditioning of the differential output to compensate for the effects of static pressure. The system's body provides a cavity for fill fluid behind each of the isolation diaphragms. At least one flat plate actuation diaphragm allows controlled movement of oil as the differential pressure of the isolation diaphragm increases. Fluid volumes are managed for thermal effects, passive thermal volume change; compensation is accomplish by offsetting the large coefficient of thermal expansion (CTE) of fill fluid by providing at least one insert whose coefficient of thermal expansion is smaller than the CTE of the system body.

12 Claims, 3 Drawing Sheets

(56) References Cited

U.S. PATENT DOCUMENTS

| | | | | |
|---|---|---|---|---|
| 4,766,769 A | * | 8/1988 | Nudd, Jr. | G01L 9/0054 |
| | | | | 73/706 |
| 4,782,703 A | * | 11/1988 | Nishi | G01L 13/025 |
| | | | | 73/708 |
| 5,731,522 A | * | 3/1998 | Sittler | G01L 19/0046 |
| | | | | 73/706 |
| 2007/0000332 A1 | * | 1/2007 | Boehler | G01L 19/0046 |
| | | | | 73/708 |
| 2007/0169557 A1 | * | 7/2007 | Harasyn | G01L 27/007 |
| | | | | 73/718 |
| 2008/0245152 A1 | * | 10/2008 | Louwagie | G01L 19/0645 |
| | | | | 73/706 |
| 2009/0078054 A1 | * | 3/2009 | Romo | G01L 19/04 |
| | | | | 73/717 |
| 2010/0147083 A1 | * | 6/2010 | Tan | E21B 47/011 |
| | | | | 73/729.1 |
| 2015/0260633 A1 | * | 9/2015 | Hedtke | G01N 17/043 |
| | | | | 73/862.637 |
| 2015/0369683 A1 | * | 12/2015 | Lemke | G01L 13/025 |
| | | | | 73/718 |

\* cited by examiner

DIFFERENTIAL PRESSURE SENSING DEVICE WITH OVERLOAD PROTECTION

CROSS-REFERENCE TO RELATED APPLICATIONS

The present application is related to U.S. Provisional Patent Application No. 62/110,097 filed on Jan. 30, 2015; the entirety of that application is incorporated herein as if set forth in full.

FIELD OF THE INVENTION

The present invention concerns differential pressure sensing devices. More particularly the present invention concerns pressure-sensing devices with overload protection using low coefficient of thermal expansion (CTE) inserts, a flat actuation diaphragm, and volume adjustment element to provide better control and more efficient use of fluids.

BACKGROUND OF THE INVENTION

This invention describes improvements to differential pressure sensors/transmitters utilizing an isolation (or protection) diaphragm and fill fluid to transmit a process pressure to the semiconductor pressure sensors.

Pressure is a fundamental process variable that can be used to determine flow rates, fluid levels, altitude, and even temperature. Sensors and transmitters are used in the field to monitor and measure any number of industrial processes. They are employed in oil and gas, pulp and paper, pharmaceuticals, food and beverage; any industry where liquids, gases, or slurries are stored, conveyed or otherwise processed. In the field, with differential pressure applications for industrial processes, sensors/transmitters may experience large line pressures, occasional overload pressures or extreme swings in operating temperatures; of which many may be fatal to the process sensor or transmitter.

With industrial pressure sensors, most of the design effort is in protecting the sensor element and thereby protecting the process from damage due to a control system failure. In such sensors, the sensing element produces an electrical output signal proportional to a pressure differential, which is determined by detecting the differential between a high, and a low-pressure port in the sensor mechanism. With industrial sensors, a structure is designed and provided to protect the sensor from circumstances that can degrade its performance, such as corrosion, electrical shorts, and over pressure.

In sensors of the type this invention is designed to improve, the sensor is provided within a body that is divided into sections that seal the sensor from damage and that provide a means to determine the differential in the pressure measurements—including high and low pressure points that are in communication with a process fluid. The static pressure of each of the pressure points provides the sensor with a measure of differential pressure—the larger the difference in the static pressures from the high and low pressure points indicate higher differential pressure, the closer the two points are indicates lesser differential pressure. The primary protection is the isolation diaphragm. The isolation diaphragm is the interface between the pressure sensor system and the process fluid. It protects the sensor from corrosive process environments. It is compliant allowing pressure to transfer from the process fluid to a fill fluid. The fill fluid communicates the pressure to the sensing element, and acts as a dielectric to prevent electrical leakage.

Protecting from overpressure is normally only done with differential pressure sensors, because they have to be sensitive enough to measure differential pressures that may be several orders of magnitude less than the process system's pressure, or the "line pressure" of the system. If the sensing element were exposed to a differential pressure equal to line pressure, the element could be destroyed. Overload protection functions by stopping fluid flow when a design differential pressure threshold is reached. The diaphragm design used in the prior art, for controlling the overload engagement, is a corrugated diaphragm or bellows. Corrugation gives the diaphragm strength and resilience, however, using corrugated diaphragms complicates the design and results in the need to add extra, non-working, fill fluid to the system to fill volumes in the system that occurs due to the inherent shape of such. This extra fill fluid becomes problematic as sensor measurement requirements become more precise and critical. The fill fluid, while typically more ideal than the process fluid, still undergoes physical change due to pressure and temperature.

Additionally, high line pressure processes can substantially affect the output of the sensing element. A common method for compensation is to include a line pressure sensor to provide a signal that can be used for adjusting the output of the differential signal accordingly. However, temperature can compromise the performance of overload protection. Another issue is that the overload protection system is sensitive to fluid volumes: the relatively large coefficient of thermal expansion of the fill fluid with respect to the system's body will change the engagement pressure of the overload protection scheme. To mitigate these effects it has been a goal of the manufacturers of sensors to keep the fill fluid volumes to a minimum. The desire to keep the volumes low, however, has in the past, been thwarted by the prior art's use of corrugated diaphragms, as noted above. In addition, the space requirements within the sensor casing is also determinative of the amount of volume, that has until now, needed to be filled with fluid.

Prior issued patent and published applications are key to an understanding of the state of the art of the present invention and show steps towards the mitigation of problems in prior sensor technology; the teachings however are insufficient to truly overcome the problems that to date plague pressure sensing equipment. U.S. Pat. No. 7,454,975 to Louwagie et al. describes using solid material to decrease fill fluid volume. However, the inventors continue the use of corrugated diaphragm thereby continuing the complexity of the housing and the need for more fill fluid to compensate for the shape of the diaphragm. U.S. Pat. No. 5,531,120 to Nagasu et al. describes the use of 3-diaphragm protection strategy, but continues the outdated use of a concentrically corrugate actuation diaphragm; Nagasu et al further teaches no passive thermal expansion compensation. US published patent application 2004/0040384 of Kurosawa et al. teaches a 4-diaphragm protection mode which is dissimilar to the present invention, but begins to described an attempt to address the issue with small concentrically corrugated actuation diaphragms. The device of Kurisawa et al. has two actuation diaphragms one for the low pressure side and one for the high pressure side so that in theory they can get equal overpressure thresholds for both sides.

In addition to the different uses of materials, types of diaphragms and fill space, prior attempts to overcome the problems of such devices have also centered on the sensor, types of sensors and location of sensors within pressure sensor devices. U.S. Pat. No. 4,841,776 to Kawachi et al. discloses a differential pressure sensor with a static pressure sensor but differs from the present invention in that the static pressure sensor is in a separate chamber to protect that device. U.S. Pat. No. 4,909,083 to Fazeli et al. discloses a differential pressure sensor with a static pressure sensor; however the two sensors are mounted on separate pedestals that are separate from the glass to metal seal. U.S. Pat. No. 5,259,248 to Ugai et al. discloses a differential pressure sensor with a static pressure sensor that uses an integrated sensor; that is it uses a sensor that detects both static and differential pressure. U.S. Pat. No. 5,029,479 to Bryan shows the use of a differential pressure sensor with a static pressure sensor that uses an integrated stacked MEMS sensor assembly.

In addition, U.S. Pat. No. 4,329,877 to Hershey, attempted to overcome the problems surrounding the volume of fill fluid by adjusting the stiffness of the actuation diaphragm rather than adjusting the volume behind the isolation diaphragm. U.S. Pat. No. 4,135,408 to Di Giovanni makes note of the issue of fluid volume problems due to manufacturing issues but suggests using available space to insert slugs before the device is sealed. Di Giovanni does not address the issue of adjusting the overload after the sensor is sealed.

It is therefore an object of the present invention to provide a means for more accurately and efficiently detecting the differential pressures in industrial applications while providing a more accurate, more efficiently constructed and better protected pressure protection device than in the prior art.

Other objects and advantages of the present invention will become apparent as the description proceeds.

SUMMARY OF THE INVENTION

In accordance with the present invention, a differential pressure sensor/transmitter unit for sensing and transmitting the pressure in a system is provided. The sensor/transmitter unit comprises a housing having a high and low pressure input ports and defines a case defining a cavity for placing a pressure sensor. Isolation diaphragms are provided for each of the input ports respectively so as to separate the unit from the process fluid to which the unit is exposed. Fluid passage conduits formed in the body, communicate the fill fluid with the cavity behind the isolation diaphragms to the rest of the device. In some embodiments the isolation diaphragms are corrugated for strength and resilience. In a preferred embodiment, a first and second volume of solid low coefficient of expansion (LCE) material, sufficient to occupy a proportionally larger volume than the fill fluid, is placed in the cavity, separated by a flat actuation diaphragm. The flat actuation diaphragm is operationally placed between the first and second volume of LCE material in a diaphragm cavity defined in the device. A volume of fill fluid, sufficient to fill the remaining space in the cavity and in the fluid passage conduits, is added to the unit. When so assembled, the differential pressure of a system can be monitored while protecting the sensor from overpressure and changes in temperature within the system. It will be understood that the sensor device is located in contact to a process fluid and the pressure thereof is determined. In such a system, the housing is divided into a low pressure region and a high pressure region by the actuation diaphragm and sealed by the isolation diaphragms such that fill fluid is separated from process fluid by isolation diaphragms.

In a preferred embodiment, the housing defines at least one cavity in connection to fluids in the system, and an adjuster, in some embodiments a pin swaged therein and in others a screw having threadings to cooperate with threadings in the cavity to allow more precise adjustment of the fluid to air ratio and/or readjustment as necessary, there within, such that the adjusters can be moved in or out of the cavity to effect the volume of fluid behind the isolation diaphragm. Further, at least one insert, comprised of a material having a low coefficient of thermal expansion and within the same volume as the fill fluid, act in the operation of the device, such that as the fluid fill expands or contracts due to temperature fluctuations the insert is able to correct the overall volume change, thereby saving the sensor from overload. In a preferred embodiment, the inserts are each comprised of multiple components designed to better fill space in the cavity.

To improve the differential pressure sensing accuracy of the system, the sensor assembly, in a preferred embodiment has in combination discrete differential and static pressure sensor. The sensors are placed on one base and the signals therefrom are combined to counter the effect that line pressure would have on a differential sensor alone.

Fundamentally, the embodiments of the disclosure are directed to a pressure sensing system that provides isolation diaphragms through which pressures are transmitted from a process fluid to a fill fluid contained within the sensing system's body. This fill fluid transfers pressure to semiconductor sensors. The semiconductor sensors provide signals for both the differential pressure and the line pressure allowing for signal conditioning of the differential output to be compensated for the effects of line pressure. The sensing system's body provides a cavity for fill fluid behind each of the isolation diaphragms. At least one flat plate actuation diaphragm allows controlled movement of oil from this cavity as the differential pressure between the high pressure port and low pressure port isolation diaphragms increases. The thickness of the flat plate actuation diaphragm and methods for adjusting the isolation diaphragm cavity volume set the working line pressure of the sensing system. Once all of the fill fluid has evacuated the isolation diaphragm's cavity the isolation diaphragm can no longer transmit pressure to the fill fluid. Fill fluid volumes are managed for thermal effects. Passive thermal volume change compensation is accomplish by offsetting the large coefficient of thermal expansion of the fill fluid by providing at least one insert whose coefficient of thermal expansion is much smaller than the coefficient of thermal expansion of the system body.

A more detailed explanation of the invention is provided in the following description and claims and is illustrated in the accompanying drawings.

DETAILED DESCRIPTION OF THE ILLUSTRATIVE EMBODIMENT

Figure 1:
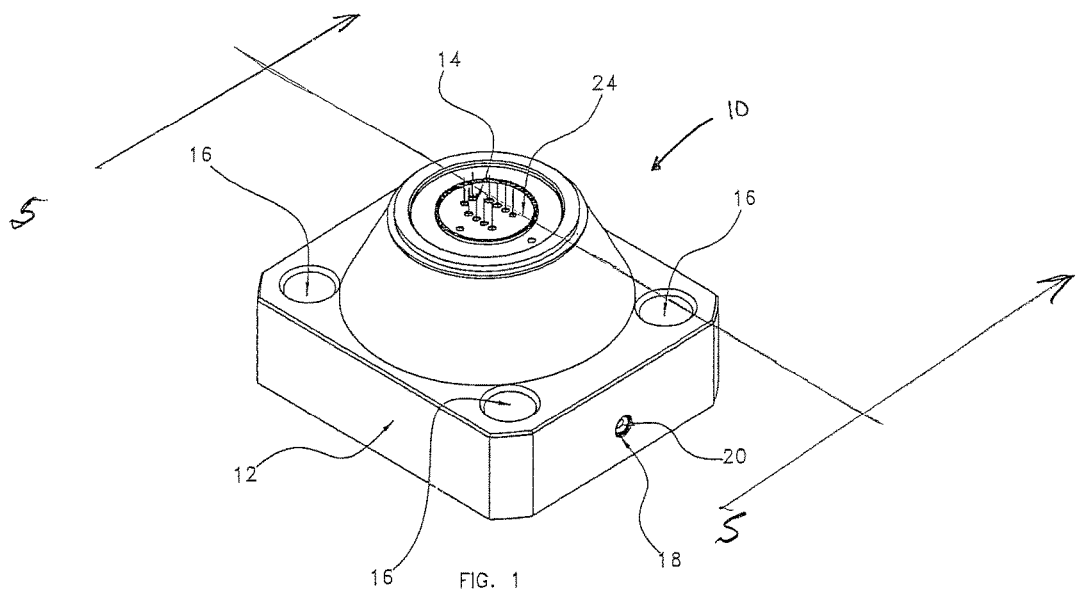
FIG. 1 is a perspective top view of a sensor made in accordance with the teachings of the present invention.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

The invention discloses a pressure sensing system that can detect a differential pressure. A differential pressure measurement determines the pressure of the High side port in reference to, or relative to, the Low side port. The absolute pressure of the Low pressure side port is referred to as the line pressure of the differential pressure.

A differential pressure can be detected by means of a semiconductor sensing element. This semiconductor-sensing element can be a microchip constructed from single crystal silicon. The allowable displaced volume of the semiconductor sensing element diaphragm is very small. If it is pushed too far the chip is destroyed. High side and Low side isolation diaphragms and channels connecting them to the High and Low side of the semiconductor sensor are provided. The interconnecting channels are filled with hydraulic fluid to communicate pressures between the isolation diaphragms and the semiconductor sensor.

The isolation diaphragms isolate the sensor from external corrosive or otherwise damaging environments and have a larger capacity for volume displacement. The method used to protect the sensor from excessive volume displacement, due to high pressure, is a third overload actuation diaphragm. If an overpressure is applied to the High or Low isolation diaphragms, the actuation diaphragm allows adequate fluid volume displacement so that the isolation diaphragm becomes pressed closely to the sensor body, essentially bottoming out. This stops fluid volume movement, preventing overpressure from being transferred to the semiconductor sensor.

Temperature can compromise the performance of overload protection. The overload system is sensitive to changes in fluid volumes. The relatively large coefficient of thermal expansion of the fill fluid with respect to the system's body will change the engagement pressure of the overload protection scheme.

Referring to the drawings, a pressure sensor 10, having a body 12 and signal and power feed pins 14 emanating from a differential pressure sensor (FIG. 3, et seq.) is shown from a perspective that allows a view of the top of the device. As shown, the body 12 has a series of threaded openings for fasteners, together 16, for mounting pressure fittings, or manifolds, to direct the process fluid to the pressure ports 28 & 30 to be described below. Access points 18, which allow access to volume adjusters 20, are also shown and will also be described below in greater detail. As will be seen, sealing balls 22 are located within concomitant openings in the top 24 of the sensor 10; the use of balls 22 will be described below.

Figure 2:
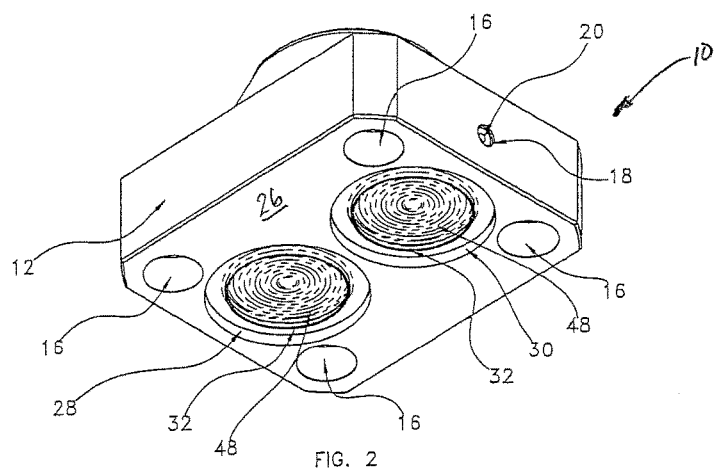
FIG. 2 is a perspective bottom view of a sensor made in accordance with the teachings of the present invention.

FIG. 2, shows a bottom perspective view of sensor 10, wherein a bottom face 26 of the body 12 having a high pressure port 28 and a low pressure port 30 defined therein. In each pressure port 28, 30 a formed retaining ring 32 is provided, which is designed to hold in place for welding and to help protect the isolation diaphragm (FIG. 3) 48.

Figure 3:
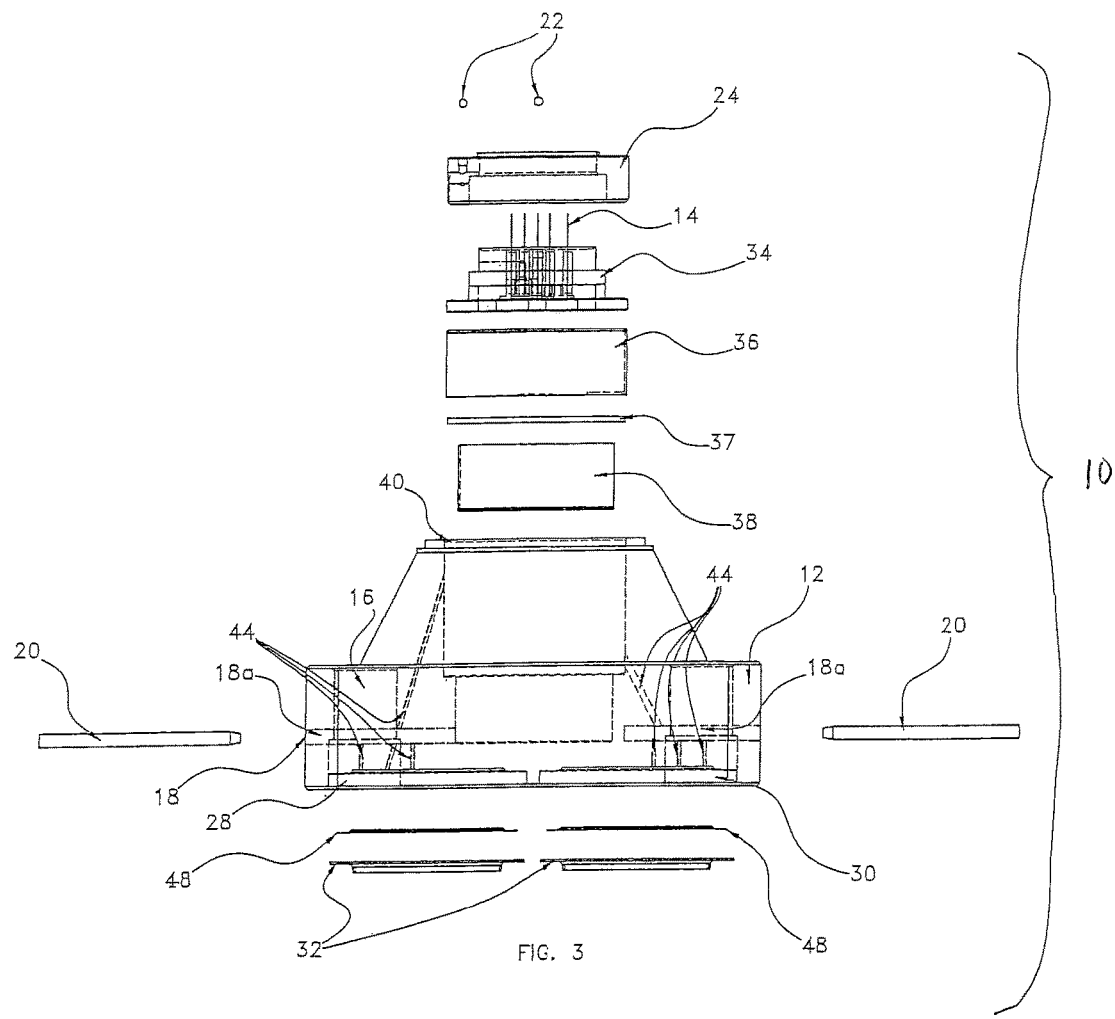
FIG. 3 is an exploded cutaway elevational view of a sensor made in accordance with the teachings of the present invention.

Referring now to FIG. 3, an exploded view of the sensor 10 of FIG. 1 is shown. Along with the body 12, a differential pressure sensor assembly 34 and the elements shown in FIGS. 1 and 2, sensor 10 also comprises upper LCE insert 36 and lower LCE insert 38 shown to be separated by at least a flat actuation diaphragm 37 and all made to fit within cavity 40 in body 12. It will be seen in greater detail, in FIG. 5, that insert 36 comprises a surface 36a and insert 38 comprises a surface 38a that are each shallowly concave and thereby can accommodate the displacement of the actuation diaphragm 37, within the cavity 39 created there between, in a manner that will lessen the volume of space above and below the actuation diaphragm 37 as will be explained below. Further, as will be explained in greater detail below, fill fluid 42 is added to body 12 to flood any open space within body 12 with fluid. Body 12 is generally a solid block with cavity 40 and fluid channels 44 defined therein; the fluid channels 44 convey the fill fluid 42 to provide the transmission of pressure onto the elements of sensor 10 such that a differentiation of high to low pressure can be determined by pressure sensor 52a in a manner known to persons having ordinary skill in the art. In addition, as shown in FIG. 3, access cavities 18a and adjusters 20 are shown and, as will be explained in greater detail below, are useful to adjust the overpressure threshold by changing the fluid volume behind the isolation diaphragms 48 by manipulation of adjusters 20. It will be understood that the space within cavity 40 below diaphragm 37 and surrounding insert 38 is filled with processing fluid 46 and the space above diaphragm 37 and surrounding insert 36 is, as noted above, filled with fill fluid 42. FIG. 3 further shows the use of corrugated diaphragms 48 at both the high-pressure port 28 and the low-pressure port 30. It will be understood that process fluid is directed to the pressure ports by the fixing of pressure fitting or manifold (not shown) via the threaded mounting holes 16 with a seal created with seal rings (not shown) between the body 12 and said fittings or manifold as will be understood by persons having ordinary skill in the art. It will be further understood that diaphragms 48 are corrugated to facilitate bottoming out in the provided spaces in the body 12.

It will be understood by persons having ordinary skill in the art that excess fluid volume in a system, such as illustrated herein, complicates the overload protection system due to the fluid's thermal expansion, or volume changes, due to temperature changes. When the fluid expands or contracts it pushes or pulls fluid from the isolation diaphragms' cavity 41 (shown in FIG. 5B). This changes the pressure overload threshold. If the fluid loss is too great the overload protection engages too soon and the sensor loses sensitivity at its full scale output, if too much fluid is added then the sensor 34 can be destroyed before the overload engages. It will be understood that prior art devices suffer from this due to the action of heat and pressure on the properties of the greater volumes of fluids in such devices.

The body 12 of the sensor contains the fill fluid 42. As with any physical material, the material of the sensor 34 expands and contracts with temperature, though advantageously at a rate much lower than the rate of expansion of the fill fluid 42. The oil in the internal channels and in the actuation diaphragm's cavity 39 is constrained by the sensor body's 34 rate of expansion. Excess expansion, relative to the body, pushes fluid into the isolation diaphragms' cavity 41 (as shown in FIG. 45B).

As is now disclosed, a passive way to manage the effects of a mismatch of thermal expansion rates, is to use a third low CTE material (LCM) with a thermal expansion value much lower than the oil 42 and the sensor body 34. Such a material is used to create the upper insert block 36 and lower insert block 38 as noted above. A calculation using the thermal expansions of the fill fluid 42, sensor body 34, and the LCM 36, 38 determines what portion of the total volume should be fill fluid 42 and what portion should be the low CTE material 36, 38. With the passive thermal compensation, when the temperature increases any excess of thermal expansion of the fill fluid 42 is offset by a deficit of thermal expansion from the low CTE material 36, 38. As will now be understood, the result is that fill fluid volume changes can be managed so as to not affect the overload protections; in addition, when used in conjunction with a flat actuation diaphragm 37, parts and manufacturing are significantly simplified.

It will be understood, that the present invention allows for the management of the thermal expansion of fill fluids and simplifies construction by use of a flat actuation diaphragm in combination with passive thermal expansion management. The combination provides consistent overload thresholds over a very broad temperature range. This is accomplished by use of low CTE (coefficient of thermal expansion) disk(s) (shown as 36 and 38 herein) placed on either side of the actuation diaphragm 37. The size of the disk(s) is calculated specifically for the materials to be used. Below is an example worksheet for a sensor using a typical fill fluid, steel body, and LCM

| Materials | CTE β |
|---|---|
| Fluid Fill | $600 \times 10^{-6}/°$ F. |
| Body | $30 \times 10^{-6}/°$ F. |
| Low CTE material (LCM) | $3 \times 10^{-6}/°$ F. |

Above are the volumetric CTEs for each of the materials used. The ratio of the CTEs for the LCM and the Fluid fill are used to determine the required volume ratio for the Low CTE material and the Fluid fill.

$$\frac{CTE \text{ of Low } CTE \text{ material} - CTE \text{ of body}}{CTE \text{ of body} - CTE \text{ of Fluid Fill}} = 23.88$$

This is the required ratio of the material volumes, LCM/fill fluid that will match the CTE of the Body and thus offset the CTE of the fluid fill. The volumes of the LCM from the required fill fluid volumes can be calculated for the channels and diaphragm displacement regions. For example if the Fill Fluid Volume calculation is done as follows:

| Description | Volume |
|---|---|
| Isolation volume Channels & distribution | 0.0011 in³ |
| Main body channels | 0.0013 in³ |
| Actuation channel | 0.0001 in³ |
| GMS channels | 0.0011 in³ |
| Volume compensation | 0.0016 in³ |
| sub total | 0.0041 in³ |
| Actuation volume | 0.0047 in³ |
| Total | 0.0100 in³ |

For 100% compensation the LCM material should have a volume of:

0.0100 in³×23.88=0.2388 in³

Based on the actual volume of the LCM (36, 38) the theoretical amount of thermal volume compensation can be determined Note: it will be understood by persons having ordinary skill in the art that complete compensation may not be desirable, for example, with high pressures it may be prudent to consider volume changes due to the compressibility of the fluid fill for very large static pressures.

An illustration of temperature compensation is shown as follows:

Temperature Volumetric Effects

| | Temperature range | | |
|---|---|---|---|
| | −40° F. | 70° F. | 220° F. |
| Total Volume of fill fluid | 0.0093 in³ | 0.0100 in³ | 0.0109 in³ |
| Volume of LCM | 0.1963 in³ | 0.1963 in³ | 0.1964 in³ |
| Volume of channels in body | 0.2057 in³ | 0.2063 in³ | 0.2071 in³ |
| Net volume | −0.0001 in³ | | 0.0001 in³ |
| Volume at isolation diaphragm | 0.0010 in³ | 0.0011 in³ | 0.0013 in³ |
| % Change at isolation diaphragm | −10% | | 13% |

The theoretical change in fluid fill volume behind the isolation diaphragm can be determined for any temperature. With this value, along with the compliance of the actuation diaphragm, the variability of the overload threshold can be determined.

Figure 4:
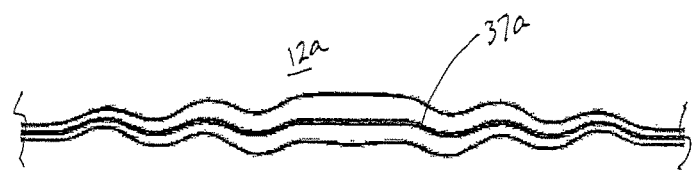
FIG. 4 is a cutaway elevational view of a section of a sensor using a diaphragm of the prior art.

As a contrast to the diaphragm 37 shown (FIG. 3) in the device of the present invention, FIG. 4 shows a diaphragm 37a of the prior art and shows that to minimize the volume of space above and below diaphragm 37a, the surfaces of the containment case 12a must be formed to mirror the contours of diaphragm 37a. Typically actuation diaphragms use concentrically corrugated profiles. They can accommodate relatively large fluid displacements. However, in order to reduce fluid volume in the system, the opposing walls of the cavity in which the diaphragm is situated must also be corrugated. As a result, each pressure threshold requires a different actuation diaphragm profile; the profile will have differing parameters for corrugation amplitude and wavelength. This means the cavity walls will be different too, all of which complicates parts and assemblies. It will be understood by persons having ordinary skill in the art that the manufacture of such faces would add complexity and costs to such devices. The present invention makes use of flat actuation diaphragms that simplify the parts of the system and make it easier to minimize fluid fill volumes. It will be understood however, that flat diaphragms cannot withstand the same volume displacements that corrugated diaphragms can; as a result fluid fill volumes must be tightly controlled. However the simplification and relative ease in the use and management of the devices of the present invention well compensates for the need to control fluid fill volumes.

Figure 5A:
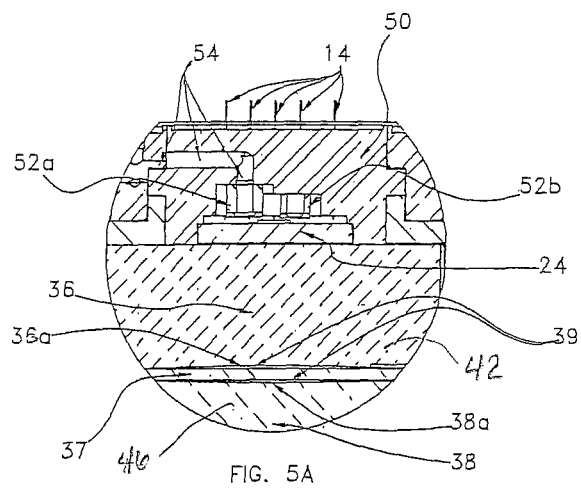
FIG. 5A is an enlarged view of the sensor element shown in FIG. 5.
Figure 5:
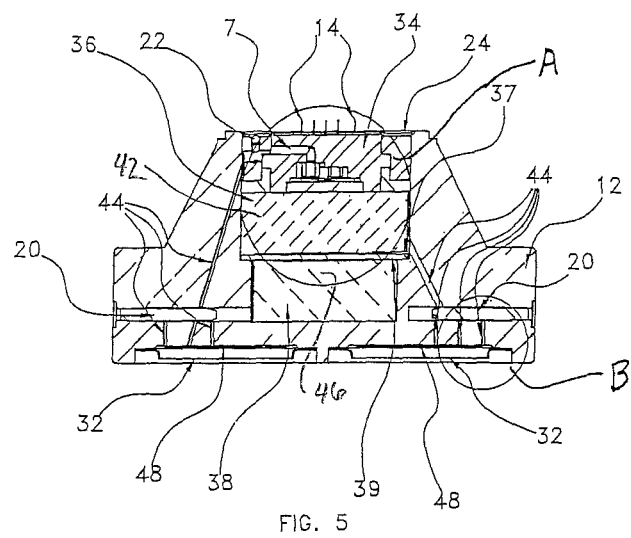
FIG. 5 is a cross-sectional elevational view of the device of FIG. 1, taken along the line 5-5 of FIG. 1.

Referring to FIG. 5, a cross sectional view of the sensor 10 is shown with all of the elements in place. The elements of FIG. 5 are the same as those shown in the exploded view of FIG. 3. In addition, a section noted as "A" is shown more clearly in FIG. 5A, described in greater detail below.

FIG. 5 shows in greater detail one embodiment of the volume adjusters 20, as noted above. It will also be understood by persons having ordinary skill in the art that the present invention mitigates the issues of assembly variance by allowing the overpressure threshold to be adjusted. This adjustment is done by changing the fluid volume behind one or both of the isolation diaphragms 48. In a preferred method, the device includes two press fit pins, one for each the low and high side, as shown in FIG. 5.

In the construction of a preferred device 10 of the present invention, an interference fit is created by taking a larger bore hole 18 and swaging it down to a smaller diameter with a forming die. The resulting smaller diameter provides the interference fit lip seal for the adjusters 20. The interference fit is designed to provide the necessary hold force to withstand very high pressures. In a preferred embodiment, the tooling is designed to create a dimple around the swage hole that could be filled with a suitable potting material.

The volume adjusters 20 are pressed into holes 18 that are bored into the body 12 and work with the fluid filled channels 44. The hole 18 is deep enough to have a volume that matches the design isolation cavity 41 volume behind the isolation diaphragm 37. After the sensor 10 has been filled with fluid, 42, 46 and sealed, the sensor 10 is powered and the adjusters 20 are pushed or pulled into or out of the channel 18a (extending from hole 18), pushing or drawing fluid to or from the cavity 41 behind the isolation diaphragm 37. The adjusters 20 are then cut and fixed to prevent movement.

An alternative method would be to use a threaded stem. The stem would be able to adjust volume by turning the stem into or out of the part. The stem would have to be packed to prevent leakage of the fill fluid. It will be understood that other methods of providing a resilient fit to adjusters 20 can be utilized without departing from the novel teachings of the present invention.

A further alternative method would be to provide a bore in the body of the device that could be compressed to reduce the volume of the bore and thus move oil to the isolation diaphragms.

Referring now to FIG. 5A, at very high static pressures, errors can develop in the differential sensor measurement. In a preferred embodiment, the assembly provides a sensor assembly 34 to measure the static pressure in addition to the differential pressure so that the errors can be corrected. Persons having ordinary skill in the art will recognize that the prior art for this type of correction has generally taken one of two routes. The first route utilizes an integrated sensor that provides both a differential and absolute measurements. This is the preferred method as it requires less manufacturing steps and parts. However these specialized chips are more difficult and expensive to source. The second method commonly employed is to provide a separate chamber and mounting assembly, connected via a channel to the High or Low side. In the separate chamber, seats a discreet absolute or gauge sensor assembly.

The innovative approach of the present invention is to place discrete differential 52a and absolute pressure sensors 52b, mounted on the same glass to metal seal 50. The glass to metal seal has hermetically sealed feed-through pins 14 that interface to compensation and amplification circuitry. This simplifies manufacturing allowing the static and differential pressure sensor assembly 34 to be mounted and wire bonded 52 at the same time. A ceramic cap 24 takes up excessive oil volume and protects the wire bonds. Channels 54 are machined into the glass to metal seal assembly 50 to provide back pressurization from the low pressure port to the differential die 52a from both the High 28 and Low 30 pressure sides of the sensor. The channel 44 routes fluid from the High pressure port to the absolute and differential sensor, providing the line pressure reference and the high pressure ports static pressure. After filling the sensor with fluid, stainless steel balls 22 are swaged into place to provide a permanent high pressure seal.

Figure 5B:
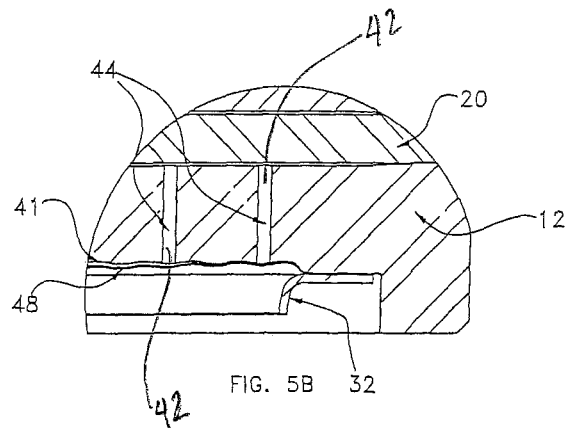
FIG. 5B is an enlarged view of the interface between the isolation diaphragm and case shown in FIG. 5.

FIG. 5B is provided to show a more close up view of the area near isolation diaphragm 48 from a cut-away view of the interior of case 12. Isolation cavity 41 can be seen in communication both with diaphragm 48 and fluid channels 44 such that pressure exerted on the exterior side of diaphragm 48 is transferred to the fluid in channels 44 and subsequently to the sensor 52.

Although an illustrative embodiment of the invention has been shown and described, it is to be understood that various modifications and substitutions may be made by those skilled in the art without departing from the novel spirit and scope of the invention.

What is claimed is:

1. A differential pressure sensor/transmitter unit for sensing and transmitting the pressure in a system, comprising:
   a housing having a first input port and a second input port;
   a body defining a cavity;
   a pressure sensor in the cavity;
   a first isolation diaphragm and a second isolation diaphragm for placement at the first input port and the second input port respectively;
   fluid passage conduits formed in said body, in communication with the cavity and the isolation diaphragms;
   a first volume of solid material inserts and a second volume of solid material inserts sufficient to occupy substantially all the volume in the cavity not occupied by the pressure sensor and the isolation diaphragms, wherein a ratio of the first volume of solid material inserts and second volume of solid material inserts and a volume of a fluid fill are optimized to compensate for thermal and compression changes in fluid fill volume;
   a flat actuation diaphragm operationally placed between the first and second volume of solid material inserts in the cavity:
   a volume of fill fluid sufficient to substantially fill the remaining space in the cavity and in the fluid passage conduits;
   wherein, the differential pressure of a system can be monitored while protecting the pressure sensor from changes in pressure and temperature within the pressure sensor/transmitter unit, and
   wherein means to adjust the volume of fill fluid includes at least one cavity in the housing in connection to fluids in the system unit and an adjuster there within, such that the adjuster can be moved in or out of the cavity to affect the volume of fluid behind the actuation isolation diaphragm.

2. The differential pressure sensor/transmitter unit for sensing and transmitting the pressure in a system of claim 1, wherein the first and second isolation diaphragms are corrugated diaphragms.

3. The differential pressure sensor/transmitter unit for sensing and transmitting the pressure in a system of claim 1, wherein the solid material inserts each have a slightly concave surface facing the other insert to form a cavity there between, wherein the flat isolation diaphragm is placed in pressure transmitting position, to thereby minimize the amount of fill fluid needed in the housing.

4. The differential pressure sensor/transmitter unit for sensing and transmitting the pressure in a system of claim 1, wherein the first and second solid material inserts are comprised of material having a low coefficient of thermal expansion such that as the fill fluid expands or contracts due to temperature fluctuations the inserts are able to compensate therefore.

5. The differential pressure sensor/transmitter unit for sensing and transmitting the pressure in a system of claim 1, wherein the adjusters are pins capable of moving in and out of the cavity to set a desired fluid fill volume.

6. The differential pressure sensor/transmitter unit for sensing and transmitting the pressure in a system of claim 1, wherein the pressure sensor is a combination discrete differential and static pressure sensor.

7. The differential pressure sensor/transmitter unit for sensing and transmitting the pressure in a system of claim 6, wherein the combination discrete differential and static pressure sensor is combined and placed on one base and the signals therefrom are combined to counter the effect that static pressure would have on a differential sensor alone.

8. The differential pressure sensor/transmitter unit for sensing and transmitting the pressure in a system of claim 1, wherein the sensor/transmitter unit is located within process fluid and a pressure thereof is determined.

9. A differential pressure sensor/transmitter unit located within a process fluid for sensing and transmitting a pressure in the process fluid, comprising:
   a housing having a first input port and a second input port;
   a body defining a cavity;
   a pressure sensor in the cavity;
   a first corrugated isolation diaphragm and a second corrugated isolation diaphragm for placement at the first input port and the second input port respectively;
   fluid passage conduits formed in said body, in communication with the cavity and the corrugated isolation diaphragms;
   a first volume of solid low coefficient of expansion (LCE) material and a second volume of solid low coefficient of expansion (LCE) material sufficient to occupy substantially all the volume in the cavity not occupied by the pressure sensor and corrugated isolation diaphragms, wherein a ratio of the LCE material and a fluid fill are optimized to compensate for thermal and compression changes in fluid fill volume;
   a flat actuation diaphragm operationally placed between the first volume and the second volume of the LCE material in the cavity;
   a volume of fill fluid sufficient to fill the remaining space in the cavity and in the fluid passage conduits;
   a first volume adjuster in communication with the fill fluid on one pressure port allowing the adjustment of overload engagement by shifting of fluid away or to the cavity behind one corrugated isolation diaphragm;
   a second volume adjuster in communication with the fill fluid on the other pressure port allowing the adjustment of overload engagement by shifting of fluid away or to the cavity behind the other corrugated isolation diaphragm; and
   wherein, the differential pressure of a process fluid can be monitored while protecting the pressure sensor from changes in pressure and temperature within the pressure sensor/transmitter unit.

10. The differential pressure sensor/transmitter unit located within a process fluid for sensing and transmitting the pressure in the process fluid of claim 9, wherein the adjusters are pins capable of moving in and out of the cavity to set a desired fluid fill volume.

11. The differential pressure sensor/transmitter unit located within a process fluid for sensing and transmitting the pressure in the process fluid of claim 9, wherein the pressure sensor is a combination discrete differential and static pressure sensor.

12. The differential pressure sensor/transmitter unit located within a process fluid for sensing and transmitting the pressure in the process fluid of claim 11, wherein the combination differential and static pressure sensor is combined and placed on one base and the signals therefrom are combined to counter the effect that static pressure would have on a differential sensor alone.

* * * * *